US012591260B2

(12) United States Patent
Wang et al.

(10) Patent No.: US 12,591,260 B2
(45) Date of Patent: Mar. 31, 2026

(54) LOW-DROPOUT REGULATOR WITH AUTO-ADJUSTING STABILITY COMPENSTION CIRCUIT

(71) Applicant: NUVOTON TECHNOLOGY CORPORATION, Hsinchu City (TW)

(72) Inventors: Hui-Chun Wang, Zhubei City (TW); Hua-Chun Tseng, Zhubei City (TW)

(73) Assignee: NUVOTON TECHNOLOGY CORPORATION, Hsinchu City (TW)

( * ) Notice: Subject to any disclaimer, the term of this patent is extended or adjusted under 35 U.S.C. 154(b) by 192 days.

(21) Appl. No.: 18/406,808

(22) Filed: Jan. 8, 2024

(65) Prior Publication Data

US 2024/0377850 A1 Nov. 14, 2024

(30) Foreign Application Priority Data

May 12, 2023 (TW) ................................ 112117825

(51) Int. Cl.
*G05F 1/56* (2006.01)
*G05F 1/575* (2006.01)

(52) U.S. Cl.
CPC ................ *G05F 1/56* (2013.01); *G05F 1/575* (2013.01)

(58) Field of Classification Search
CPC . G05F 1/462; G05F 1/468; G05F 1/56; G05F 1/562; G05F 1/563; G05F 1/565; G05F 1/59; G05F 1/575; G05F 1/561
See application file for complete search history.

(56) References Cited

U.S. PATENT DOCUMENTS

| | | | | |
|---|---|---|---|---|
| 10,073,478 | B1 * | 9/2018 | Ivanov | G05F 1/595 |
| 2013/0113454 | A1 * | 5/2013 | Chen | G05F 1/56<br>323/312 |
| 2022/0147085 | A1 * | 5/2022 | Hsu | G05F 1/575 |

* cited by examiner

*Primary Examiner* — Alex Torres-Rivera
*Assistant Examiner* — Ularislao Cordova
(74) *Attorney, Agent, or Firm* — MUNCY, GEISSLER, OLDS & LOWE, P.C.

(57) ABSTRACT

A low-dropout regulator with an automatic adjustment stability compensation circuit is provided. The low-dropout regulator includes an analog positive power supply; a compensation circuit; a PMOS; an error amplifier; a reference voltage; a load capacitance; a soft start circuit; a first resistor; and a second resistor. The drain of the PMOS is connected to one end of the first resistor and a node is formed at the connection to output voltage; the gate of the PMOS is connected to the output of the error amplifier and compensation circuit; the other end of the first resistor is connected in series with the second resistor, and the other end of the second resistor is grounded; the non-inverting input end of the error amplifier is connected to the reference voltage, and the inverting input end is connected to the one of the two resistors.

3 Claims, 2 Drawing Sheets

LOW-DROPOUT REGULATOR WITH AUTO-ADJUSTING STABILITY COMPENSTION CIRCUIT

CROSS-REFERENCE TO RELATED APPLICATION

This application claims the priority benefit of Taiwan application no. 112117825, filed on May 12, 2023, the full disclosure of which is incorporated herein by reference.

BACKGROUND

Technical Field

The present invention is related to an application of the existing soft start circuit of the low dropout regulator to detect the soft start time to estimate the size of the load capacitance, and then change the compensation circuit to improve the stability of the low dropout regulator.

Description of Related Art

When using a low-dropout regulator (LDO), it can be operated with or without an external capacitor. However, the capacitance of the external capacitor will also change greatly, which can make it difficult to design the stability of the low-dropout regulator.

SUMMARY

A first aspect of this invention is to meet the needs of different customers using low dropout regulator circuits and can output stable voltage without oscillation under different applications.

A second aspect of this invention is to complete the normal operation of the low-dropout regulator without additional power consumption.

A third aspect of this invention is to change the compensation circuit to achieve the optimization of the stability of the low dropout regulator.

To achieve the above aspects and other aspects, this invention provides a low-dropout regulator with auto-adjusting stability compensation circuit. The low-dropout regulator comprises an analog virtual device driver; a compensation circuit; a P-type metal oxide semiconductor field effect transistor; an error amplifier; a voltage reference; a load capacitance; a soft start circuit; a first resistor; and a second resistor. Wherein a source of the PMOS is connected to the analog virtual device driver. A drain of the PMOS is connected to one end of the first resistor to form a node at the connection to output voltage. A gate of the PMOS is connected to the output of the error amplifier and the compensation circuit. The other end of the first resistor connected in series with the second resistor, and the other end of the second resistor is grounded. The load capacitance is connected in parallel with the first resistor and the second resistor. A non-reverse input terminal of the error amplifier is connected to the reference voltage, the reverse phase input terminal is connected to the connection point between the first resistor and the second resistor. A negative power supply terminal of the error amplifier is connected to the compensation circuit. The soft start circuit is signally connected to the compensation circuit.

DETAILED DESCRIPTION

Figure 1:
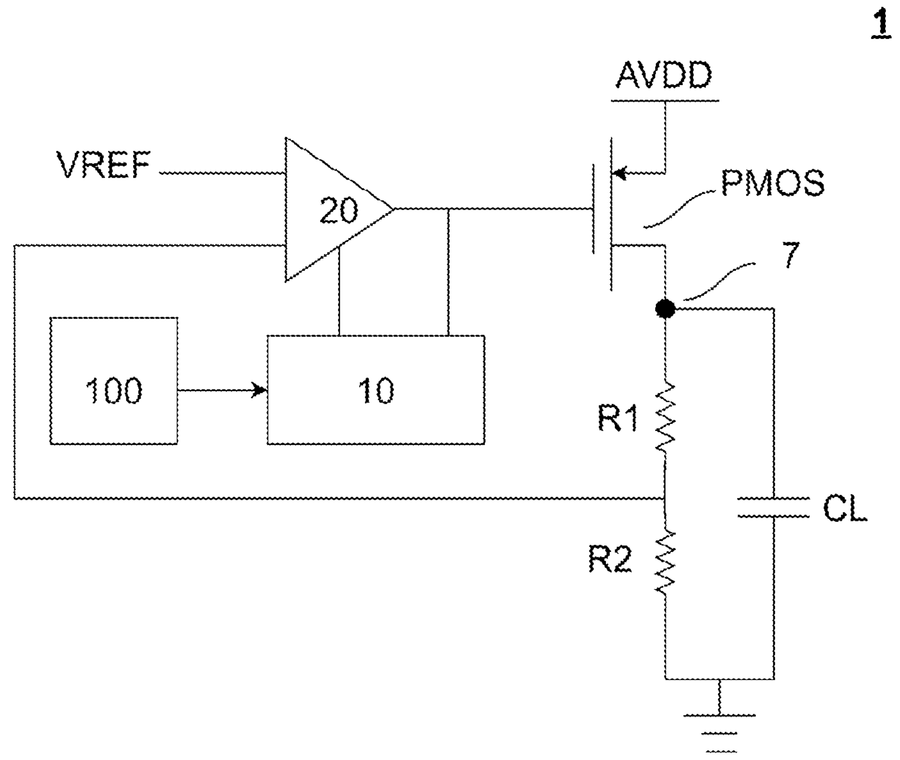
FIG. 1 is a circuit structure diagram according to an embodiment of this invention.

The present disclosure discloses a low-dropout regulator with auto-adjusting stability compensation circuit. FIG. 1 is a circuit structure diagram of the present disclosure. In FIG. 1, the low-dropout regulator (LDO) 1 comprises an analog virtual device driver AVDD, also known as virtual voltage; a compensation circuit 10; a P-type metal oxide semiconductor field effect transistor PMOS; an error amplifier 20; a voltage reference VREF; a load capacitance CL; a soft start circuit 100; a first resistor R1; and a second resistor R2. The source of the P-type metal oxide semiconductor field effect transistor PMOS is connected to the analog virtual device driver AVDD. The drain of the P-type metal oxide semiconductor field effect transistor PMOS is connected to one end of the first resistor R1 to form a node 7 at the connection site to output voltage. The gate of the P-type metal oxide semiconductor field effect transistor PMOS is connected to the output of the error amplifier 20 and the compensation circuit 10. The other end of the first resistor R1 is connected in series with the second resistor R2, and the other end of the second resistor R2 is grounded. The load capacitance CL is connected in parallel with the first resistor R1 and the second resistor R2. A non-reverse input terminal of the error amplifier 20 is connected to the reference voltage VREF. A reverse phase input terminal is connected to a connection point between the first resistor R1 and the second resistor R2. A negative power supply terminal of the error amplifier is connected to the compensation circuit. The soft start circuit 100 is signally connected to the compensation circuit 10.

Figure 2:
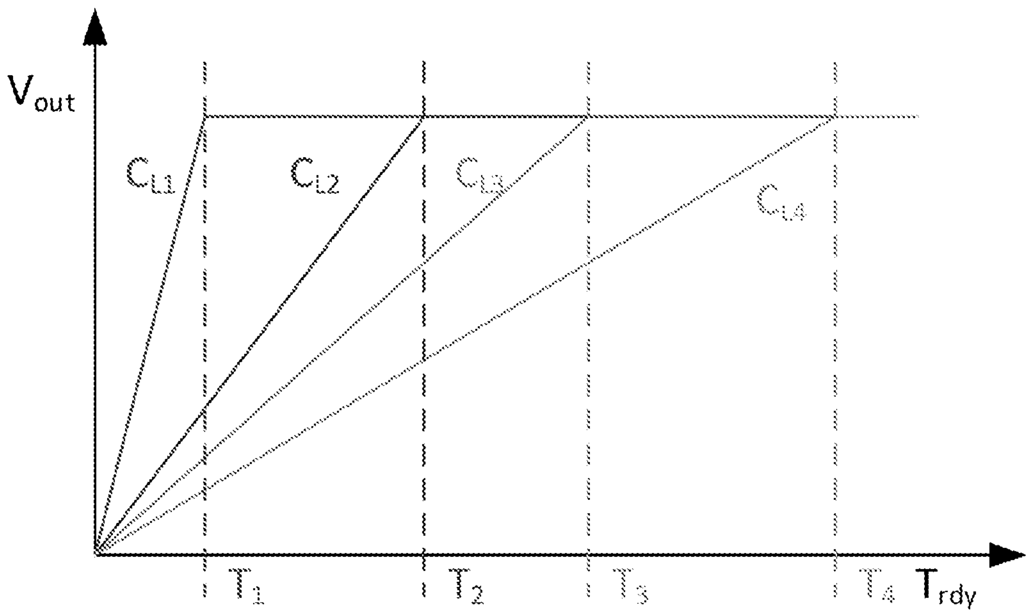
FIG. 2 is a diagram of the change in soft start time caused by different capacitance of this invention.

FIG. 2 is a diagram of the change in soft start time caused by different load capacitance CL of the present disclosure. In FIG. 2, the vertical axis represents the output voltage (Vout), and the horizontal axis represents the soft start time (Trdy). When the output voltages (Vout) of the compensation circuit 10 are the same but the load capacitance values are different (such as CL1~CL4), the soft start time of the compensation circuit 10 is correspondingly changed (such as T1~T4). By detecting the soft start time of the LDO through the soft start circuit 100, the load capacitance (CL) value range of the LDO 10 can be determined, and then the LDO compensation circuit 10 is controlled based on the load capacitance value range, to improve the stability of the LDO. After the LDO soft-start procedure is completed, the soft-start circuit 100 can be automatically turned off, or the LDO soft-start time detection function of the soft-start circuit 100 can be turned off to avoid unnecessary power consumption.

Figure 3:
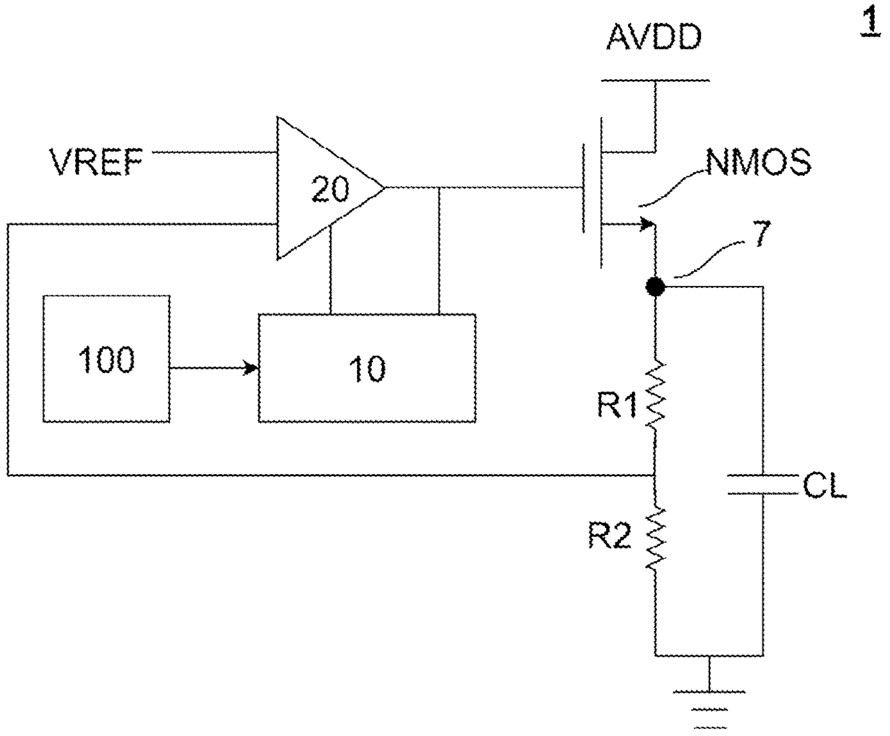
FIG. 3 is a circuit structure diagram according to another embodiment of this invention.

FIG. 3 is a circuit structure diagram according to another embodiment of this invention. In FIG. 3, the P-type metal oxide semiconductor effect transistor PMOS in FIG. 1 is replaced with an N-type metal oxide semiconductor effect transistor NMOS. The rest of the structure is as stated above, and the operation mode and functions are the same as those of the embodiment shown in FIG. 1 and will not be described again here.

Figure 4:
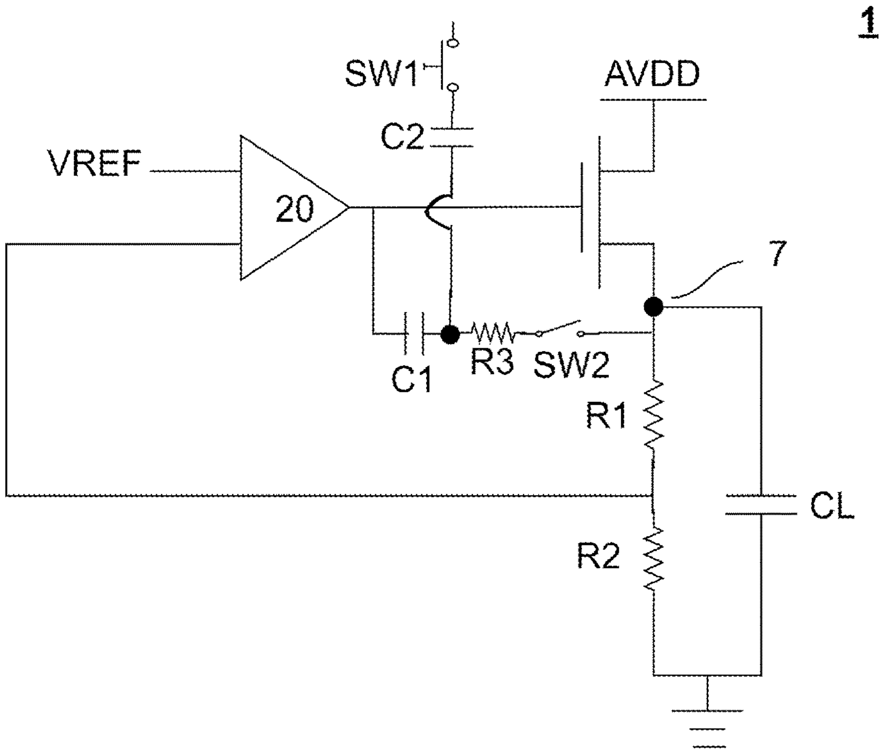
FIG. 4 is a detailed circuit diagram of the compensation circuit of this invention.

FIG. 4 is a detailed circuit diagram of the compensation circuit of the present disclosure. Two embodiments are provided for explanation of the LDO compensation circuit 10. When the first switch SW1 is turned on and the second switch SW2 is turned off, the first embodiment of the compensation circuit 10 comprises a first capacitor C1, a second capacitor C2 and a first switch SW1, where C2 is an adjustable capacitor. If the detected load capacitance CL value is larger, the capacitance value of capacitor C2 can be reduced to perform compensation. When the first switch SW1 is turned off and the second switch SW2 is turned on, the second embodiment of the compensation circuit 10 comprises a first capacitor C1, a third resistor R3, and a second switch SW2, where C1 is an adjustable capacitor. If the detected load capacitance CL value is large, the capacitance value of C1 can be reduced to perform compensation.

The compensation circuits 10 of FIG. 1, FIG. 2 and FIG. 4 are only examples, and the compensation method of the LDO in the present disclosure is not limited to the above methods.

What is claimed is:

1. A low-dropout regulator with an automatic adjustment stability compensation circuit, the low-dropout regulator comprising:

an analog virtual device driver;

a compensation circuit;

a P-type metal oxide semiconductor field effect transistor (PMOS);

an error amplifier;

a voltage reference;

a load capacitance;

a soft start circuit;

a first resistor; and a second resistor;

wherein a source of the PMOS is connected to the analog virtual device driver, a drain of the PMOS is connected to one end of the first resistor to form a node at the connection to output voltage, a gate of the PMOS is connected to the output of the error amplifier and the compensation circuit, the other end of the first resistor is connected in series with the second resistor, the other end of the second resistor is grounded, the load capacitance is connected in parallel with the first resistor and the second resistor, a non-reverse input terminal of the error amplifier is connected to the reference voltage, the reverse input terminal is connected to the connection point between the first resistor and the second resistor, a negative power supply terminal of the error amplifier is connected to the compensation circuit, and the soft start circuit is signally connected to the compensation circuit; and wherein the soft-start circuit detects a soft-start time of the low-dropout regulator, and determines a load capacitance value range, and controls the compensation circuit based on the determined load capacitance range.

2. The low-dropout regulator of claim 1, wherein the PMOS can be replaced with a n-type metal oxide semiconductor field effect transistor (NMOS).

3. The low-dropout regulator of claim 1, wherein the low-dropout regulator is suitable for a variety of different load capacitance needs.

* * * * *